United States Patent
Iwamura et al.

(10) Patent No.: US 9,999,031 B2
(45) Date of Patent: *Jun. 12, 2018

(54) MOBILE COMMUNICATION METHOD, RADIO BASE STATION, AND MOBILE STATION

(71) Applicant: NTT DOCOMO, INC., Tokyo (JP)

(72) Inventors: Mikio Iwamura, Tokyo (JP); Tooru Uchino, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 70 days.

This patent is subject to a terminal disclaimer.

(21) Appl. No.: 14/920,597

(22) Filed: Oct. 22, 2015

(65) Prior Publication Data

US 2016/0113001 A1  Apr. 21, 2016

Related U.S. Application Data

(63) Continuation of application No. 14/111,706, filed as application No. PCT/JP2012/059167 on Apr. 4, 2012, now Pat. No. 9,198,171.

(30) Foreign Application Priority Data

Apr. 22, 2011 (JP) .................................. 2011-096315

(51) Int. Cl.
*H04W 72/04* (2009.01)
*H04W 24/10* (2009.01)
(Continued)

(52) U.S. Cl.
CPC ....... *H04W 72/0406* (2013.01); *H04W 24/10* (2013.01); *H04W 72/0413* (2013.01);
(Continued)

(58) Field of Classification Search
CPC ................................................. H04W 72/1284
See application file for complete search history.

(56) References Cited

U.S. PATENT DOCUMENTS

| 9,572,193 B2* | 2/2017 | Horneman .......... H04W 76/043 |
| 2008/0026738 A1* | 1/2008 | Jiang ...................... H04L 47/10 |
| | | 455/418 |

(Continued)

FOREIGN PATENT DOCUMENTS

| WO | 2009116939 A2 | 9/2009 |
| WO | 2010/017454 A1 | 2/2010 |

(Continued)

OTHER PUBLICATIONS

International Search Report for corresponding International Application No. PCT/JP2012/059167, dated May 22, 2012 (3 pages).

(Continued)

*Primary Examiner* — Jay P Patel
(74) *Attorney, Agent, or Firm* — Osha Liang LLP

(57) ABSTRACT

To further notify the amount of data retained in the transmission buffer used in a communication among a plurality of MOBILE STATIONs to a RADIO BASE STATION, the mobile communication method according to the present invention includes: transmitting, with a MOBILE STATION (UE#1), a BSR (#1) indicating the amount of data retained in a transmission buffer corresponding to a logical channel in a Uu interface to a RADIO BASE STATION (eNB); transmitting, with a MOBILE STATION (UE1), a BSR (#2) indicating the amount of data retained in a transmission buffer corresponding to a logical channel in a Ud interface to the RADIO BASE STATION (eNB); and distinguishing, with the RADIO BASE STATION (eNB), the BSR (#1) from the BSR (#2) based on predetermined information included in the received BSR.

1 Claim, 3 Drawing Sheets

(51) Int. Cl.
*H04W 72/12* (2009.01)
*H04W 92/18* (2009.01)

(52) U.S. Cl.
CPC ....... *H04W 72/1284* (2013.01); *H04W 76/14* (2018.02); *H04W 92/18* (2013.01)

(56) References Cited

U.S. PATENT DOCUMENTS

| | | | |
|---|---|---|---|
| 2009/0052420 A1* | 2/2009 | Fischer | G08C 17/02 370/338 |
| 2010/0034113 A1* | 2/2010 | Marinier | H04L 47/10 370/252 |
| 2010/0254340 A1 | 10/2010 | Park et al. | |
| 2010/0261469 A1 | 10/2010 | Ribeiro et al. | |
| 2010/0268775 A1 | 10/2010 | Doppler et al. | |
| 2010/0302946 A1 | 12/2010 | Yang et al. | |
| 2010/0322098 A1* | 12/2010 | Pelletier | H04W 72/1252 370/252 |
| 2011/0274044 A1* | 11/2011 | Park | H04L 47/10 370/328 |
| 2012/0069805 A1* | 3/2012 | Feuersanger | H04W 72/1284 370/329 |
| 2012/0113922 A1* | 5/2012 | Kim | H04W 72/1284 370/329 |
| 2013/0058220 A1* | 3/2013 | Yi | H04W 72/1284 370/241 |
| 2013/0094455 A1* | 4/2013 | Wu | H04W 24/02 370/329 |
| 2014/0023008 A1 | 1/2014 | Ahn et al. | |
| 2018/0007677 A1* | 1/2018 | Seo | H04L 1/1861 |

FOREIGN PATENT DOCUMENTS

| | | | | |
|---|---|---|---|---|
| WO | 2010018507 A1 | 2/2010 | | |
| WO | 2010102668 A1 | 9/2010 | | |
| WO | WO 2010/102668 | * 9/2010 | ............ | H04W 76/00 |
| WO | WO 2010/131884 A2 | * 11/2010 | ........ | H04W 72/1284 |

OTHER PUBLICATIONS

Written Opinion for corresponding International Application No. PCT/JP2012/059167, dated May 22, 2012 (3 pages).
LG Electronics Inc., "Relative Buffer Status Reporting"; 3GPP TSG-RAN WG2 meeting #46bis, R2-050852; Beijing, China; Apr. 4-8, 2005 (3 pages).
3GPP TS 36.300 V10.3.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)"; Mar. 2011 (197 pages).
Search Report issued in corresponding European Application No. 12774100.7, dated Sep. 19, 2014 (6 pages).
Office Action in counterpart European Patent Application No. 12774100.7, dated Jul. 4, 2016 (8 pages).
Office Action issued in the counterpart European Patent Application No. 12774100.7, dated May 19, 2017 (8 pages).

* cited by examiner

MOBILE COMMUNICATION METHOD, RADIO BASE STATION, AND MOBILE STATION

TECHNICAL FIELD

The present invention relates to a mobile communication method, a RADIO BASE STATION and a MOBILE STATION.

BACKGROUND ART

A communication among a plurality of MOBILE STATIONS UE is performed through a radio access network apparatus, a core network apparatus or the like in a cellular mobile communication system in Wideband-Code Division Multiple Access (W-CDMA) system, Long Term Evolution (LTE) system, or the like.

CITATION LIST

Non-Patent Literature

Non-patent Literature 13GPP TS 36.300

SUMMARY OF INVENTION

However, in the conventional cellular mobile communication system, for example, in the LTE mobile communication system, although a RADIO BASE STATION UE can recognize the amount of data retained in the transmission buffer used in a communication between a MOBILE STATION UE and the RADIO BASE STATION eNB, the RADIO BASE STATION eNB cannot recognize the amount of data retained in the transmission buffer used in a communication among a plurality of MOBILE STATIONs UE.

Thus, there is a problem in that the RADIO BASE STATION eNB cannot control such a communication with taking into account the amount of data retained in the transmission buffer used in the communication among a plurality of MOBILE STATIONs UE.

In light of the foregoing, an objective of the present invention is to provide a mobile communication method, a RADIO BASE STATION and a MOBILE STATION that are capable of notifying, to the RADIO BASE STATION, the amount of data retained in the transmission buffer used in a communication among a plurality of MOBILE STATIONs separately from the amount of data retained in the transmission buffer used in a communication between a MOBILE STATION and the RADIO BASE STATION.

The gist of a first feature of the present invention is a mobile communication method including: transmitting, with a first MOBILE STATION, a data signal to a RADIO BASE STATION through a RADIO BASE STATION interface set between the first MOBILE STATION and the RADIO BASE STATION, transmitting, with the first MOBILE STATION, a data signal to a second MOBILE STATION through an inter-MOBILE STATION interface set between the first MOBILE STATION and the second MOBILE STATION, transmitting, with the first MOBILE STATION, a first buffer status report indicating an amount of data retained in a transmission buffer corresponding to a logical channel in the RADIO BASE STATION interface to the RADIO BASE STATION, transmitting, with the first MOBILE STATION, a second buffer status report indicating an amount of data retained in a transmission buffer corresponding to a logical channel in the inter-MOBILE STATION interface to the RADIO BASE STATION, and determining, with the RADIO BASE STATION, which the buffer status report is, the first buffer status report or the second buffer status report, based on predetermined information included in the received buffer status report.

The gist of a second feature of the present invention is A RADIO BASE STATION including: a receiving unit configured to receive a buffer status report from a MOBILE STATION, in which the receiving unit configured to determine based on predetermined information included in the received buffer status report which the buffer status report is, a first buffer status report indicating an amount of data retained in a transmission buffer corresponding to a logical channel in a RADIO BASE STATION interface set between the MOBILE STATION and the RADIO BASE STATION, or a second buffer status report indicating an amount of data retained in a transmission buffer corresponding to a logical channel in the inter-MOBILE STATION interface set between the MOBILE STATION and another MOBILE STATION.

The gist of a third feature of the present invention is a MOBILE STATION including: a transmitting unit configured to transmit a data signal to a RADIO BASE STATION through a RADIO BASE STATION interface set between the MOBILE STATION and the RADIO BASE STATION and transmit a data signal to another MOBILE STATION through an inter-MOBILE STATION interface set between the MOBILE STATION and the other MOBILE STATION, in which the transmitting unit configured to transmit, to the RADIO BASE STATION, a first buffer status report indicating an amount of data retained in a transmission buffer corresponding to a logical channel in a RADIO BASE STATION interface, and a second buffer status report indicating an amount of data retained in a transmission buffer corresponding to a logical channel in the inter-MOBILE STATION interface.

DESCRIPTION OF EMBODIMENT (Mobile Communication System According to the First Embodiment of the Present Invention)

A mobile communication system according to the first embodiment of the present invention will be described with reference to FIGS. 1 to 5.

Figure 1:
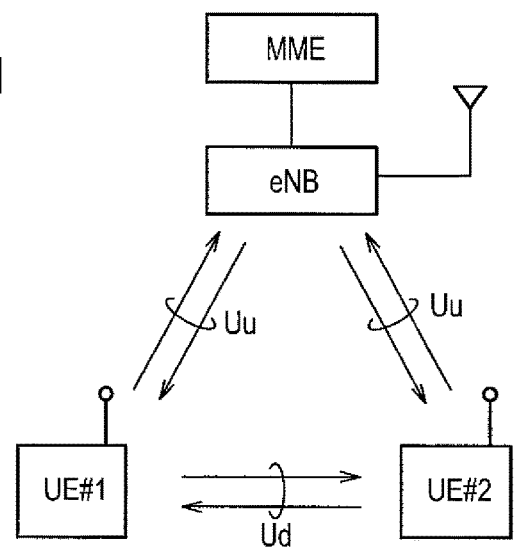
FIG. 1 is a view of the whole structure of a mobile communication system according to a first embodiment of the present invention.

The mobile communication system according to the present embodiment is an LTE mobile communication system, and includes a mobility management node Mobility Management Entity (MME) and a RADIO BASE STATION eNB connected in such a way as to be under the mobility management node MME as illustrated in FIG. 1. Note that the present invention can also be applied to cellular mobile communication systems other than an LTE mobile communication system.

In that case, data signals are transmitted and received between the RADIO BASE STATION eNB and MOBILE STATIONs UE#1/UE#2 through Uu interfaces. A data signal is transmitted and received between the MOBILE STATION UE#1 and the MOBILE STATION UE#2 through a Ud interface.

In other words, the MOBILE STATION UE#1 can transmit and receive a data signal to/from the MOBILE STATION UE#2 through the RADIO BASE STATION eNB (through the Uu interface) or can also transmit and receive a data signal to/from the MOBILE STATION UE#2 without the RADIO BASE STATION eNB (through the Ud interface).

Similarly, the MOBILE STATION UE#2 can transmit and receive a data signal to/from the MOBILE STATION UE#1 through the RADIO BASE STATION eNB (through the Uu interface) or can also transmit and receive a data signal to/from the MOBILE STATION UE#1 without the RADIO BASE STATION eNB (through the Ud interface).

Figure 2:
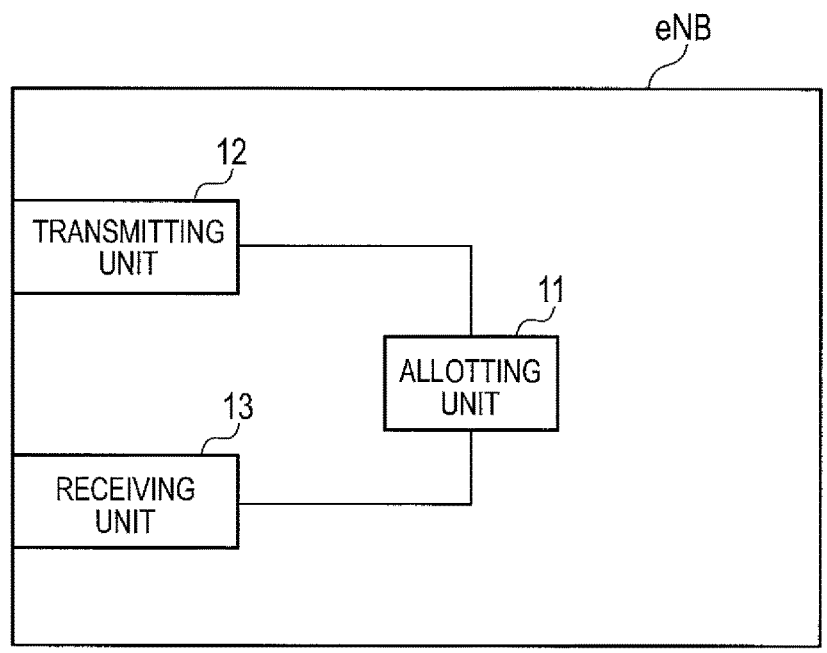
FIG. 2 is a functional block diagram of a RADIO BASE STATION according to the first embodiment of the present invention.

As illustrated in FIG. 2, the RADIO BASE STATION eNB includes an allotting unit 11, a transmitting unit 12, and a receiving unit 13.

The allotting unit 11 is configured to allot the identification information of the logical channels in the Uu interface and the identification information of the logical channels in the Ud interface to the MOBILE STATION UE#1 and the MOBILE STATION UE#2.

In that case, for example, the allotting unit 11 is configured to allot a Logical Channel Identity (LCID) or a Logical Group Priority (LGP) as the identification information of a logical channel.

Figure 3:
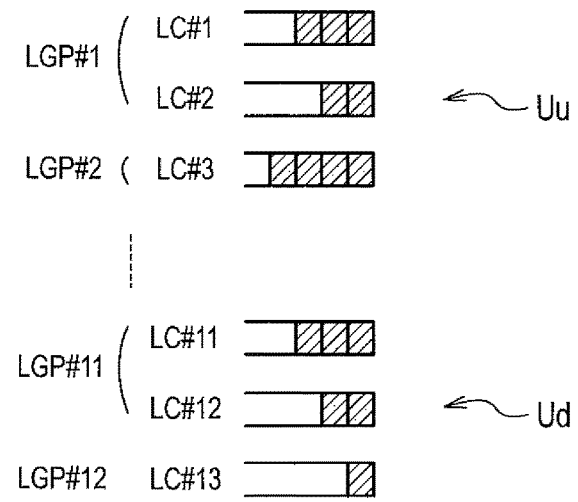
FIG. 3 is a view of an exemplary method for allotting LCs and LGPs with the RADIO BASE STATION according to the first embodiment of the present invention.
Figure 4:
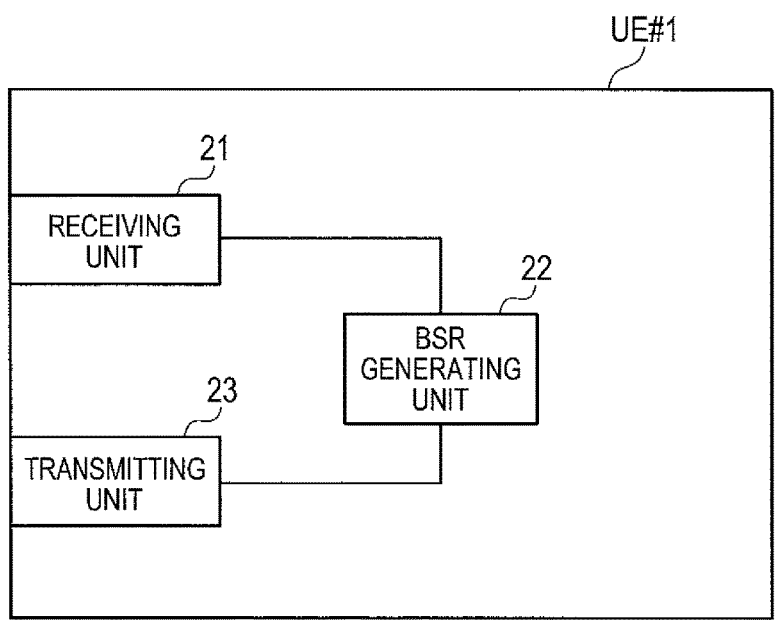
FIG. 4 is a functional block diagram of a MOBILE STATION according to the first embodiment of the present invention.

As illustrated in FIG. 3, the allotting unit 11 is configured to allot LC#1 to LC#3 as the identification information of the logical channels in the Uu interface and to allot LC#11 to LC#13 as the identification information of the logical channels in the Ud interface.

In the example of FIG. 3, the allotting unit 11 is further configured to allot the LCs such that the LC#1 and LC#2 belong to LGP#1, the LC#3 belongs to LGP#2, the LC#11 and LC#12 belong to LGP#11, and the LC#13 belongs to LGP#12.

The transmitting unit 12 is configured to transmit a data signal and a control signal to the MOBILE STATION UE#1 and the MOBILE STATION UE#2 through the Uu interface.

In that case, the transmitting unit 12 is configured to transmit notification signals for notifying the identification information (LCID or LGP) of a logical channel in the Uu interface and the identification information (LCID or LGP) of a logical channel in the Ud interface that have been allotted with the allotting unit 11 to the MOBILE STATION UE#1 and the MOBILE STATION UE#2 through the Uu interface.

The receiving unit 13 is configured to receive a data signal and a control signal from the MOBILE STATION UE#1 and the MOBILE STATION UE#2 through the Uu interface.

Specifically, the receiving unit 13 is configured to receive BSR#1 and BSR#2 from the MOBILE STATION UE#1 and the MOBILE STATION UE#2 through the Uu interface.

In that case, the BSR#1 is a BSR indicating the amount of data retained in the transmission buffer corresponding to a logical channel in the Uu interface. The BSR#2 is a BSR indicating the amount of data retained in the transmission buffer corresponding to a logical channel in the Ud interface.

The receiving unit 13 is configured to determine, based on predetermined information included in the received BSR, which the BSR is, the BSR#1 or the BSR#2.

For example, the receiving unit 13 can be configured to determine that the BSA is the BSR#2 when a predetermined flag (Flag) is set on the received BSR.

The receiving unit 13 is further configured to determine that the BSR is the BSR#1 when the identification information (LCID or LGP) of a logical channel included in the received BSR has a value within a first range. The receiving unit 13 can also be configured to determine that the BSR is the BSR#2 when the identification information (LCID or LGP) of a logical channel included in the received BSR has a value within a second range.

The receiving unit 13 can also be configured to determine, based on the protocol header information (for example, the type of MAC PDU) included in the received BSR, that the BSR is the BSR#2.

Hereinafter, the configuration of the MOBILE STATION UE#1 will be representatively described because the MOBILE STATION UE#1 and the MOBILE STATION UE#2 basically have the same configuration.

As illustrated in FIG. 2, the MOBILE STATION UE#1 includes a receiving unit 21, a BSR generating unit 22, and a transmitting unit 23.

The receiving unit 21 is configured to receive a data signal and a control signal from the RADIO BASE STATION eNB through the Uu interface and to receive a data signal from the MOBILE STATION UE#2 through the Ud interface.

For example, the receiving unit 21 can be configured to receive notification signals for notifying the identification information (LCID or LGP) of a logical channel in the Uu interface and the identification information (LCID or LGP) of a logical channel in the Ud interface from the RADIO BASE STATION eNB.

The BSR generating unit 22 is configured to generate the BSR#1 and the BSR#2 at a predetermined timing.

In that case, the BSR generating unit 22 is configured to cause the BSR#1 and the BSR#2 to include the identification information (LCID or LGP) of a logical channel in the Uu interface and the identification information (LCID or LGP) of a logical channel in the Ud interface, respectively.

The BSR generating unit 22 can also be configured to set a predetermined flag to the BSR#2.

The transmitting unit 23 is configured to transit a data signal and a control signal to the RADIO BASE STATION eNB through the Uu interface and to transmit a data signal to the MOBILE STATION UE#2 through the Ud interface.

At that case, the transmitting unit 23 is configured to transmit the BSR#1 and BSR#2 generated with the BSR generating unit 22 at a predetermined timing to the RADIO BASE STATION eNB through the Uu interface.

Note that the timing for generating the BSR#1 and the timing for generating the BSR#2 can be at the same time or at different times. The timing for transmitting the BSR#1 and the timing for transmitting the BSR#2 can be at the same time or at different times.

The predetermined timing can be the time when new data to be transmitted is generated in a high priority logical channel based on the LGP, the time when the amount of data retained in the transmission buffer has varied by a predetermined value or more, or the time when a predetermined time has elapsed since the previous BSR has been transmitted.

The predetermined timing can also be the time when an allotment for an uplink transmission of the Uu interface occurs.

Especially, when the data to be transmitted has been stuffed in the resource allotted for an uplink transmission and this has left a region large enough to include a BSR, a BRS can be generated and included therein.

Hereinafter, the operation when data signals are transmitted and received between the MOBILE STATION UE#1 and the MOBILE STATION UE#2 through the Ud interface in the mobile communication system according to the present embodiment will be described with reference to FIG. 5.

Figure 5:
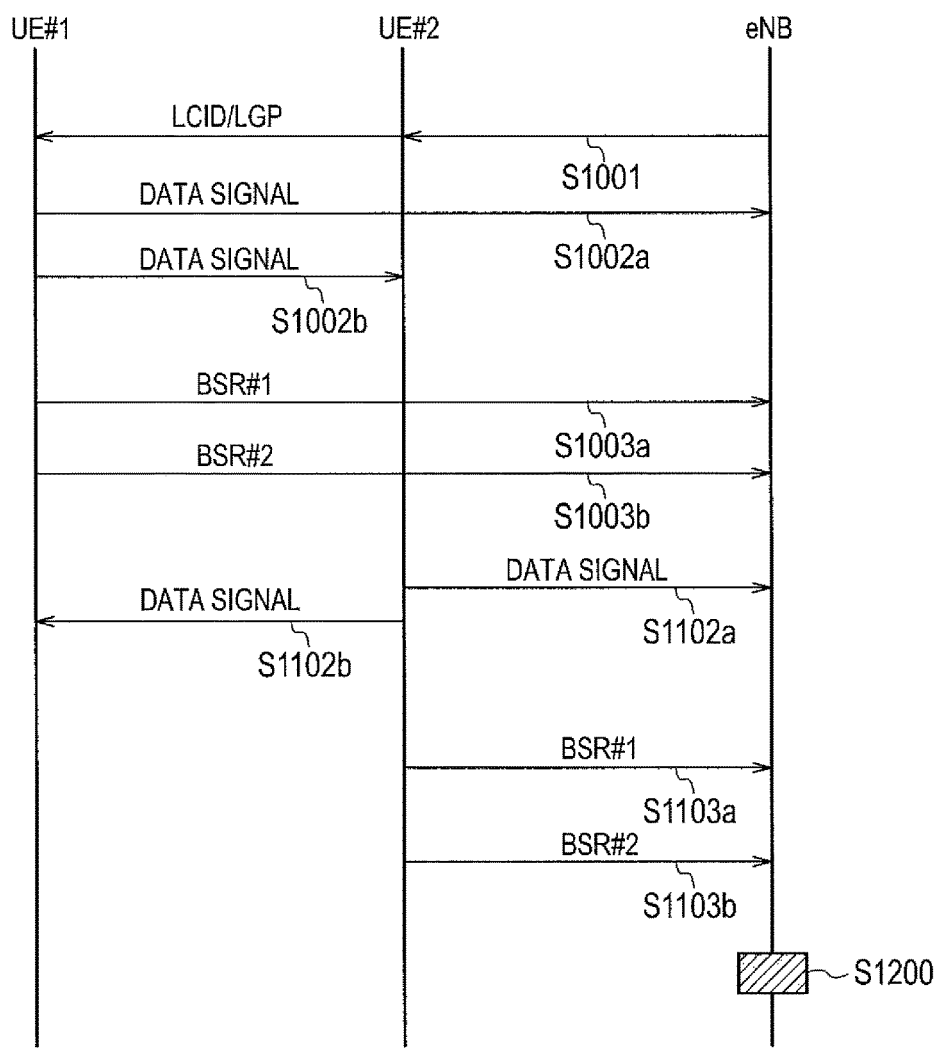
FIG. 5 is a sequence diagram for describing the operation of the mobile communication system according to a first embodiment of the present invention.

As illustrated in FIG. 5, in step S1001, the RADIO BASE STATION eNB allots and notifies the identification information (LCID or LGP) of a logical channel in the Du interface and the identification information (LCID or LGP) of a logical channel in the Ud interface to the MOBILE STATION UE#1 and the MOBILE STATION UE#2 in the procedure for starting transmitting and receiving the data signals between the MOBILE STATION UE#1 and the MOBILE STATION UE#2 through the Ud interface.

After that, the MOBILE STATION UE#1 starts transmitting a data signal to the RADIO BASE STATION eNB as illustrated in step S1002a and starts transmitting a data signal to the MOBILE STATION UE#2 as illustrated in step S1002b.

At that time, the MOBILE STATION UE#1 transmits the BSR#1 to the RADIO BASE STATION eNB at a predetermined timing as illustrated in step S1003a and transmits the BSR#2 as illustrated in step S1003b.

Similarly, the MOBILE STATION UE#2 starts transmitting a data signal to the RADIO BASE STATION eNB as illustrated in step S1102a and starts transmitting a data signal to the MOBILE STATION UE#1 as illustrated in step S1102b.

At that time, the MOBILE STATION UE#2 transmits the BSR#1 to the RADIO BASE STATION eNB at a predetermined timing as illustrated in step S1103a and transmits the BSR#2 as illustrated in step S1103b.

In step S1200, the RADIO BASE STATION eNB performs a process for controlling a communication between the MOBILE STATION UE#1 and the MOBILE STATION UE#2 based on the BSR#1 and the BSR#2 received from the MOBILE STATION UE#1 and the MOBILE STATION UE#2.

At that time, the RADIO BASE STATION eNB can perform a process for scheduling a communication between the MOBILE STATION UE#1 and the MOBILE STATION UE#2 based on the BSR#1 and the BSR#2.

For example, the RADIO BASE STATION eNB can determine based on the BSR#1 and the BSR#2 whether to perform a communication between the MOBILE STATION UE#1 and the MOBILE STATION UE#2 through the Uu interface (or, namely, through the RADIO BASE STATION eNB) or through the Ud interface (or, namely, without the RADIO BASE STATION eNB).

According to the mobile communication system of the first embodiment of the present invention, the RADIO BASE STATION eNB can control a communication between the MOBILE STATION UE#1 and the MOBILE STATION UE#2 with taking into account not only the BSR#1 but also the content of the BSR#2 because the MOBILE STATION UE#1 and the MOBILE STATION UE#2 are configured to transmit the BSR#2 in addition to the BSR#1 to the RADIO BASE STATION eNB.

The above-described aspects in the present embodiment can also be expressed as the following.

A first aspect of the present invention is a mobile communication method including: transmitting, with a MOBILE STATION UE#1 (a first MOBILE STATION), a data signal to a RADIO BASE STATION eNB through a Uu interface (a RADIO BASE STATION interface) set between the MOBILE STATION UE#1 and the RADIO BASE STATION eNB; transmitting, with the MOBILE STATION UE#1, a data signal to a MOBILE STATION UE#2 (a second MOBILE STATION) through a Ud interface (an inter-MOBILE STATION interface) set between the MOBILE STATION UE#1 and the MOBILE STATION UE#2; transmitting, with the MOBILE STATION UE#1, a BSR #1 (a first buffer status report) indicating an amount of data retained in a transmission buffer corresponding to a logical channel in the Uu interface to the RADIO BASE STATION eNB; transmitting, with the MOBILE STATION UE1, a BSR #2 (a second buffer status report) indicating an amount of data retained in a transmission buffer corresponding to a logical channel in the Ud interface to the RADIO BASE STATION eNB; and distinguishing, with the RADIO BASE STATION eNB, the MSR #1 from the BSR #2 based on predetermined information included in the received BSR.

The first aspect of the present embodiment can include allotting, with the RADIO BASE STATION eNB, at least one of an LCID and an LGP as identification information of a logical channel in the Uu interface and identification information of a logical channel in the Ud interface.

A second aspect of the present invention is a RADIO BASE STATION eNB including: a receiving unit 13 configured to receive a BSR from a MOBILE STATION US, the receiving unit 13 configured to determine based on predetermined information included in the received BSR which the BSR is, a BSR #1 or a BSR #2.

The second aspect of the present invention can include an allotting unit 11 configured to allot at least one of an LCID and an LGP as identification information of a logical channel in the Uu interface and identification information of a logical channel in the Ud interface.

In the second aspect of the present invention, the receiving unit 13 can be configured to determine that the BSR is the BSR #2 when a predetermined flag is set on the received BSR.

In the second aspect of the present invention, the receiving unit 13 is configured to determine that the BSR is the BSR #1 when the identification information (LCID or LGP) of a logical channel included in the received BSR has a value within a first range, and the receiving unit 13 can also be configured to determine that the BSR is the BSR #2 when identification information (LCID or LGP) of a logical channel included in the received BSR has a value within a second range.

A third aspect of the present invention is a MOBILE STATION UE#1 including: a transmitting unit 23 configured to transmit a data signal to a RADIO BASE STATION eNB through a Uu interface and to transmit a data signal to another MOBILE STATION UE#2 through a Ud interface; the transmitting unit 23 configured to transmit, to the RADIO BASE STATION eNB, a BSR #1 indicating an amount of data retained in a transmission buffer corresponding to a logical channel in the Uu interface, and a BSR indicating an amount of data retained in a transmission buffer corresponding to a logical channel in the Ud interface.

In the third aspect of the present invention, a predetermined flag can be set on the BSR #2.

Note that the above-mentioned operations of the RADIO BASE STATION eNB, the MOBILE STATIONs UE, and the like can be implemented with hardware, can be implemented with a software module executed with the processor, or can be implemented with the combination thereof.

The software module can be provided in an arbitrary format storage medium such as a random access memory (RAM), a flash memory, a read only memory (ROM), an erasable programmable ROM (EPROM), an electrically erasable and programmable ROM (EEPROM), a register, a hard disk, a removal disk, and a CD-ROM.

The storage medium is connected to a processor such that the processor can read and write information from/to the storage medium. The storage medium can be integrated in a processor. The storage medium and the processor can be provided in an ASIC. The ASIC can be provided in the RADIO BASE STATION eNB, the MOBILE STATIONs UE, or the like. Each of the storage medium and the processor can be provided in the RADIO BASE STATION eNB, the MOBILE STATIONs UE, or the like as a discrete component.

The present invention has been described in detail above with the embodiment. However, it is obvious for a person with an ordinary skill in the art that the present invention is not limited to the embodiment described herein. The present invention can be modified or altered without departing from the gist and scope of the invention defined by the description of the claims. Thus, the description herein is aimed at describing examples and does not mean any limitations on the present invention.

Note that Japanese Patent Application No. 2011-096315 (filed Apr. 22, 2011) is incorporated herein by reference in its entirety.

INDUSTRIAL APPLICABILITY

As described above, the present invention can provide a mobile communication method, a RADIO BASE STATION and a MOBILE STATION that are capable of notifying, to a RADIO BASE STATION, the amount of data retained in the transmission buffer used in a communication among a plurality of MOBILE STATIONs separately from the amount of data retained in the transmission buffer used in a communication between a MOBILE STATION and the RADIO BASE STATION.

REFERENCE SIGNS LIST

UE MOBILE STATION
eNB RADIO BASE STATION
11 allotting unit
12, 23 transmitting unit
13, 21 receiving unit
22 BSR generating unit

The invention claimed is:

1. A mobile communication method comprising:
transmitting, with a first MOBILE STATION, a data signal to a RADIO BASE STATION through a RADIO BASE STATION interface set between the first MOBILE STATION and the RADIO BASE STATION;
transmitting, with the first MOBILE STATION, a data signal to a second MOBILE STATION through an inter-MOBILE STATION interface set between the first MOBILE STATION and the second MOBILE STATION;
transmitting, with the first MOBILE STATION, a first buffer status report indicating an amount of data retained in a transmission buffer corresponding to a logical channel in the RADIO BASE STATION interface to the RADIO BASE STATION;
transmitting, with the first MOBILE STATION, a second buffer status report indicating an amount of data retained in a transmission buffer corresponding to a logical channel in the inter-MOBILE STATION interface to the RADIO BASE STATION; and
determining, with the RADIO BASE STATION, which the buffer status report is, the first buffer status report or the second buffer status report, based on predetermined information included in the received buffer status report.

* * * * *